United States Patent [19]

Luckenbach

[11] Patent Number: 4,803,256

[45] Date of Patent: Feb. 7, 1989

[54] METHOD OF ALTERING THE SURFACE OF A SOLID SYNTHETIC POLYMER

[75] Inventor: Roy Luckenbach, Charlotte, N.C.

[73] Assignee: Dow Corning Corporation, Midland, Mich.

[21] Appl. No.: 150,877

[22] Filed: Feb. 1, 1988

[51] Int. Cl.$^4$ ............................................. C08G 63/12
[52] U.S. Cl. ................................... 525/420; 525/437; 528/486; 528/488; 528/489; 528/492
[58] Field of Search ................ 525/420, 437; 528/486, 528/488, 489, 492

[56] References Cited

U.S. PATENT DOCUMENTS

| | | | |
|---|---|---|---|
| 2,590,402 | 8/1948 | Hall et al. | 8/115.5 |
| 2,828,528 | 4/1958 | Gajjar | 28/76 |
| 4,136,218 | 1/1979 | Nischwitz et al. | 427/339 |
| 4,352,917 | 10/1982 | Tripp | 528/26 |
| 4,370,143 | 1/1983 | Bauer | 8/493 |
| 4,427,557 | 1/1984 | Stockburger | 252/8.7 |
| 4,463,036 | 7/1984 | Totten et al. | 427/389 |
| 4,569,974 | 2/1986 | Gillberg-LaForce | 525/437 |

OTHER PUBLICATIONS

Textile Fibers, Dyes, Finishes, and Processes by Howard Needles, pp. 184–185.

Some Observations on the Effects of Selected Dye Carriers on Poly(ethylene terephthalate) by V. Ravichandran et al., Nov. 1987, pp. 35–37.

Comfort Finishing of Synthetic Fabrics by Bruce M. Latta, pp. 33–53.

*Primary Examiner*—Maurice J. Welsh
*Assistant Examiner*—L. Henderson
*Attorney, Agent, or Firm*—Robert L. McKellar

[57] ABSTRACT

The instant invention deals with the alteration of solid synthetic polymers to improve the overall functional performance of the polymers. The invention also deals with a fast, clean, efficient, inexpensive method of altering the surface of textiles. The method comprises contacting a textile with a swelling agent and a base and heating to alter the textile, and then acidifying the treating bath and contacting the textile with an active substance, such as a hydrophilic polymer, to further alter the textile.

26 Claims, No Drawings

METHOD OF ALTERING THE SURFACE OF A SOLID SYNTHETIC POLYMER

The instant invention deals with the alteration of solid synthetic polymers to improve the overall functional performance of the polymers. The invention deals with a fast, clean, efficient, inexpensive method of altering solid polymers. This invention also offers the advantage of being able to impart improvements to the functional performance of solid polymers while also offering the advantage of a minimal step processing of the solid polymers to move them from the prefinished stage of processing to the finished goods. Finally, this invention offers the advantage of being able to impart durability to the functional properties achieved as a result of the use of the process of this invention.

BACKGROUND OF THE INVENTION

The textile industry is probably the oldest industry in the world and is probably one of the largest of all of the established industries. Originally built primarily on the natural fibers, wool and cotton, the industry has evolved to one which includes cotton and wool, and synthetic textiles, and blends of the synthetics with wool and cotton. The most synthetic fibers used today include polyester, rayon and nylon (and other Aramids), along with a few specialized synthetic fibers, such as those manufactured basically from vinylidene chloride; modified cellulosic fiber such as cellulose acetate and cellulose triacetate; acrylic fibers modacrylic fibers; olefin fibers such as polyethylene and polypropylene; vinyon; vinal; azlon: nytril and novoloid, rayon and polyester having been developed during the advent of World War I, and the major development of Nylon taking place just prior to and during World War II. Polyester is the most heavily utilized man-made fiber in the world today.

The synthetic fibers which are used to create the synthetic textiles, do not have all of the properties desired by man and so there has been an excessive number of methods generated to alter the fibers and/or the textiles to enhance such desired properties. Zeronian and Collins, in an article entitled "Improving the Comfort of Polyester Fabrics", S. Haig Zeronian and Martha J. Collins, American Association of Textile Chemists and Colorists Book of Papers, 1987 International Conference and Exhibition, Oct. 14-16 1987, Charlotte Convention Center, Charlotte, NC, state that the strength, abrasion resistance, resiliency, and dimensional stability are considered to be satisfactory for most end uses of polyester. "However, polyester does have deficiencies in that it is hydrophobic and oleophilic. Polyester will build up static charge and oily stains on polyester are very difficult to remove." Zeronian et al, referencing Latta, B. M. "Clothing Comfort: Interaction of Thermal Ventilation. Construction and Assessment Factors. Eds. Hollies, N. R. S. and Goldman, R. F. Ann Arbor Science, Ann Arbor, Mich., 1977, pps 33–53, state that "There is the perception, also, that polyester fabrics are not as comfortable as natural fiber fabrics. In 1977, Latta stated that the comments of consumers suggested that the principal limitations of synthetics are unnatural hand, unpleasant thermal sensation, clamminess of fabric in contact with skin, lack of moisture absorbency, unfamiliar skin contact sensations and static-related problems. Much research and development work has been done over the years to improve the properties which have been thought to be inadequate."

Zeronian and Collins then proceed to discuss the techniques that can be undertaken to improve apparel comfort, stating, "Apparel comfort can be improved by a variety of techniques including apparel design fabric construction, yarn construction, fiber modification, blending fibers of different generic classes and topical finishing. The fiber modification can be accomplished either chemically and/or by engineering to change for example, the fiber cross section." Zeronian et al reference the following U.S. Pat. Nos.: Bauer, J. U.S. Pat. No. 4,370,143, issued Jan. 25, 1983; Nischwitz, E. et al, U.S. Pat. No. 4,136,218, issued on Jan. 23, 1979; Tripp, J. U.S. Pat. No. 4,352,917, issued Oct. 5, 1982; Stockburger, G. J. U.S. Pat. No. 4,427,557, issued Jan. 24, 1984; Totten, G. E. and Sabia, A. J. U.S. Pat. No. 4,463,036, issued July 31, 1984; Gillbers-LaForce G. E. and DeMartino, R. N., U.S. Pat. No. 4,569,974, issued Feb. 11, 1986; Hall, J. D. H., Ridge, B. P. and Whinfield, J. R. U.S. Pat. No. 2,590,402, issued Mar. 25, 1952, and Gajjar, N. J. U.S. Pat. No. 2,828,528, issued Apr. 1, 1958.

The U.S. Patent to Hall deals with the treatment of polyester with caustic to get lightweight polyester. It is now known that the caustic in that process literally chemically attacked the polyester and destroyed the polymer structure to give the weight loss.

The Gajjar patent deals with a special process to obtain low weight polyester fabrics, namely a calendering step at 100 degrees F. to 450 degrees F. under pressure, then a dry heat step at 250 degrees F. to 450 degrees F., then a caustic hydrolysis and drying to give the low weight fabric.

The Nischwitz process uses resinous binders to fix highly absorbing cellulose ethers on to the surface of the fibrous materials.

The Totten patent also describes a topical application using a hydrophillic copolymer and using an acid catalyst to enhance the fixation of the polymer to the surface of the fibrous material.

The Gillberg-LaForce patent deals with a process for the surface modification of polyester using an oligomer having a plurality of ester linkages in its molecule which are intended to attach to the surface of the fiber polymer.

Another topical application to fabric is the process described in the Stockburger patent, wherein anionic copolymers of ethylene glycol, polyethylene glycol, aromatic dicarboxylic acid and alkali metal salts of a sulphonated aromatic dicarboxyllic acid are used to improve soil resistance and improve water wicking of the fabric.

Yet another similar application is that found in the Tripp patent, wherein silylated organic polymers are used on polyester to impart hydrophillic properties to the treated fabric.

Finally, the most pertinent of the patents is the '143 patent issued to Bauer, in which there is disclosed a process for imparting improved moisture wicking, soil release and decreased static cling, which consists of immersing polyester fabric in an alkaline bath, adjusting the pH of the bath to 5.5 or less using acetic acid, and then adding a hydrophillic polyester polymer. Example 1 also describes the addition of trichlorobenzene after the adjustment of the pH to the acid side. Also, Examples 2 and 3 describe dye carriers but they do not describe the use of such carriers with the caustic treatment, an essential part of the instant invention.

A second area of the prior art is the preparation, dyeing, and finishing processes that are currently used in the textile industry. It is necessary to incorporate that background in this specification in order for those skilled in the art to have a full appreciation for the instant invention. Thus, fabric preparation includes wetting out of the fabric, scouring to remove natural waxes or spin finishes on the substrate, desizing to remove sizing from woven and warp knitted fabric, and bleaching to remove color from and to brighten the fabric. In dealing with this part of the textile process, Needles H. L., "Textile Fibers, Dyes, Finishes, and Processes", Noyes Publication, Park Ridge, NJ 1986, pps 154–157 discusses the requirements for preparation and drying of the textile in readiness for the final finishes. On reading Needles, one quickly observes that "Drying processes are currently under intense examination, since they account for nearly two thirds of the energy consumed in textile wet processing." Needles then goes on to discuss the "wet out" using surfactants; the scouring processes to remove oil and waxes, including the scouring of textiles using caustic; desizing using dilute acids or enzyme treatments and short washing techniques; drying by the use of squeeze rolls or by passing the fabric over narrow slits from which sonic velocity steam blows water from the fabric or draws water from the fabric by vacuum, and, the final step of removing remaining water by convection, conduction or radiation heating.

A third area of the prior art that has been briefly discussed in the Bauer patent supra, that is of importance to the instant invention is the area of disperse dye carriers used in polyester dyeing. Here, too, Needles has discussed the current state of the art regarding the dyeing of polyesters. Thus, at page 184 he discusses various specialized techniques for application of disperse dyes to polyesters. The importance of the disclosure on that page is not the dyeing process itself, but the fundamental understanding of the part that disperse dye carriers play in the process of dyeing polyesters. That discussion is being incorporated herein, in part, as an understanding of the mode of action of the disperse dye carriers in polyester dyeing. Thus, he discloses that the carriers penetrate the polyester, open up the molecular structure of the fiber (often resulting in swelling of the fiber), and aid in passage of the disperse dye across the dye solution-fiber interface and within the fiber. Needles also discusses the need for elevated temperatures, and high pressures in some cases, along with the disperse dye carriers, to effect the dyeing of the polyesters in a uniform manner. He notes that suitable carriers include aromatic hydrocarbons such as diphenyl and methylnaphthalene phenolics such as o-and p-phenylphenol, halogenated aromatics such as the di- and trichloro-benzenes, aromatic esters including methyl salicylate, butyl benzoate, and diethylphthalate, and benzaldehydes. Finally, Needles discusses "thermosol dyeing" in which polyester containing disperse dye applied to the fiber surface is heated near 200 degrees centrigrade under partial vacuum for a short period of time. Needles comments that "At this temperature, the molecular motion within the polyester is high, permitting the dye vapor to penetrate into the fiber. On cooling, the disperse dye is permanently trapped and fixed within the fiber. Finally, Needles sets forth the various industry accepted means by which the process can be carried out, namely, fiber/-stock dyeing; yarn/skein dyeing; package dyeing; jig dyeing: beck dyeing: jet dyeing; range dyeing, beam dyeing, and foam dyeing.

In another pertinent article regarding the use of disperse dye carriers, "Some Observations on the Effects of Selected Dye Carriers on Poly(ethylene terephthalate)", Ravichandran, V. et al., Textile Chemist and Colorist, November, 1987, Vol. 19 No. 11, pg. 35, Ravichandran et al observed that the disperse dye carriers gave enhanced wicking and wettability to pretreated poly(ethylene terephthalate) fabrics, and that the increased wettability persisted even after the fabrics were stripped of the carrier by solvent extraction, concluding that the pretreatment gave some permanent change to the poly(ethylene terephthalate), speculating that the disperse dye carriers exert a dual role in modifying the PET surface and plasticizing the polymer bulk. Thus, one can observe that the process of moving a textile from the prefinish stage to the finished stage requires an extreme amount of handling and processing if the current art technologies are used.

The instant invention overcomes most of the problems associated with the prior art processes. Most notably, the instant invention process is fast, efficient, clean, inexpensive and is essentially a one-step scouring/desizing process for removing the materials used in the manufacture of the fiber and the materials used for subsequent treatment in the fabrication of the textile, from such textiles. These materials include substances such as oils, sizes, spin finishes, lubricants, knitting oils and graphite, just to name a few.

The instant invention enhances some of the functional properties of the treated textile, namely, with continuous polyester filament, the end product is totally lint free. The polyester end product retains its non-flammable characteristics; has an enhanced moisture regain property which is durable; retains it wrinkle free characteristics; is quick drying, hence leading to large energy savings; has enhanced soil release properties; has enhanced printability, and in some cases, the instant process creates printability on textiles; the instant invention process reduces Barre of the end product and the instant invention process enhances the water absorbency of the end product, even on those textiles that are considered to be hydrophobic, such as nylon and polyester and, the instant invention process is forgiving in the sense that it can be used on a variety of textiles and in a variety of equipment already being used by the textile industry, without any major modifications of the equipment being necessary.

THE INVENTION

The instant invention therefore deals with two processes, the first process deals with a method of altering the surface of a solid synthetic polymer, the method comprising (I) contacting the solid synthetic polymer with a bath of a swelling agent, or a mixture of swelling agents, and a base, at a pH of seven or greater;

(II) heating the bath to a temperature of at least 100 degrees F for a time of at least 1 second;

(III) acidifying the bath to a pH of less than 7;

(IV) separating the polymer and the bath, whereby a polymer having an altered surface is obtained. The instant invention also deals with a second method of altering the surface of a solid synthetic polymer, the method comprising (I) contacting the polymer with a bath of a swelling agent, or a mixture of swelling agents, and a base, at a pH of seven or greater;

(II) heating the bath to a temperature of at least 100 degrees F. for a time of at least 1 second;

(III) acidifying the bath to a pH of less than 7;

(IV) contacting the polymer with an active substance for at least five minutes at a temperature of greater than room temperature;

(V) thereafter separating the polymer and the bath whereupon a polymer with an altered surface is obtained.

The treatment of solid synthetic polymeric textiles is the preferred mode of this invention. The inventor herein contemplates that the word "textile" as used herein encompasses synthetic, synthetic/natural blends, and synthetic blends of fibers, both filament and spun, in all forms including fiber, yarn, tow, and fiberfill, and in all forms of babric structures including woven, knit and nonwoven. Also contemplated within the scope of this invention are synthetic films such as aramid, polyester, and nylon films. For purposes of this invention, the invention consists of two processes. As noted above, the first process comprises contacting the textile with a bath of a swelling agent and a base. The process is useful on all of the textile fabrics that are currently used in the textile industry, as long as the textile can withstand the rigors of the initial caustic bath. Preferred for this invention, are the textiles having large volumes in use, such as polyesters, aramids, and blends of these materials with cotton and wool. What is meant by "contacting" for purposes of this invention, is that any process normally used in the textile industry today, that gives rise to a situation where an aqueous solution can contact the textile, is considered useful in this invention. Preferred for this invention are the beam dyeing and jet dyeing methods.

The apparatus useful herein is not critical and only requires that one have the ability to raise and lower the temperature of the bath in the most expeditious manner, since the invention contemplates that the process can be run at elevated temperatures, and further, the apparatus in certain cases, must be capable of holding elevated pressures, at least to about 1550 psig.

One of the major chemical reagents useful in this inventive process is a base. The bases in the process are used in steps (I) and (II) and include the alkali metal hydroxides, amines, including ammonia, sodium and potassium sesquicarbonates, the silicates, for example sodium metasilicate, lime, the phosphates, for example trisodium phosphate, magnesia, potassium cyanide, sodium carbonate and the like. The bases useful in this invention are those that give a pH in excess of 10 in water and most preferred are the bases that give a pH of 11 or more.

The second major chemical ingredient used in this invention is the swelling agent. This material is a common textile chemical and is used primarily in the disperse dyeing process of polyesters. Its use in the instant invention is to induce swelling of the textile being treated. It is used in conjunction with the a base. It has been found by the inventor herein, that the swelling agent when used in conjunction with the a base, enhances the effect of the base over the processes in the prior art that just use the base by itself. This particular combination of chemicals and the function they perform in the instant invention are not found in the prior art processes, and further, it would not have been obvious from a reading of the prior art that one could gain the benefits of the instant invention by such a combination. Thus, the inventor herein believes, but should not be held to such a theory, that this process causes swelling while physical imperfections are created in the fabric, which causes the imperfections to cover more of the fabric and also to be uniform in physical size and volume. The swelling agents commonly used in the textile industry are the agents contemplated by inventor herein as all of the swelling agents commonly used in the industry appear to be useable in this invention. Such agents are represented by those set forth above as disperse dye carriers, and an equivalent list of such chemicals can be found on page 184 of the Needles text, which list is hereby incorporated by reference. It should be noted by those skilled the art that mixtures of such swelling agents can be used in this invention, and it should be noted that many of such swelling agents are sold commercially as mixtures.

Generally, the process is carried out in step (I) by situating the textile to be treated in the apparatus and creating a bath using water. With or without heating, the swelling agent is added to the bath. Then the a base is added to the bath. The base can be added as a solid or it can be added as an aqueous solution, directly to the water in the apparatus. The pH of the bath at this point is naturally alkaline, and it is preferred that the pH be in excess of 11, although, it is not a requirement of this invention that the pH be in excess of 11, as long as the pH at this point is on the alkaline side. At this point, step (II), the heating of the bath is started, or continued, if already started, to reach a temperature of at least 100 degrees F. It is contemplated within the scope of this invention to combine steps (I) and (II) to a degree, in that the bath and apparatus can be heating while the textile, a base and the swelling agent are being added to the apparatus. The length of time that the bath and apparatus need to be heated, of course, depends on the equipment, but it is preferred that the heating be as expeditious as possible in order to save time. The rate of heating the bath and apparatus is preferred to be at the rate of 3 degrees/minute to 8 degrees/minute, it being most preferred by the inventor herein to maintain a rate of closer to 8 degrees/minute. The order of the addition of the chemicals to the bath is not critical and it is not necessary that the bath contain both chemicals initially, as long as both are present prior to the time that the minimum operating temperature is reached. As indicated supra, the desirable operating temperature in step (II) is a minimum of at least 100 degrees F., it being recognized by the inventor herein and those skilled in the art that lower temperatures will work in this invention but the time required to effect the treatment is lengthened considerably, and the benefits to be derived by the use of the instant invention begin to disappear. Preferred operating temperatures in step (II) range from 100 degrees F. to 600 degrees F., it being recognized that such higher operating temperatures result in superheated steam. It has been found by the inventor herein, that the use of the superheated steam is sometimes necessary in the treatment of synthetic textiles, in order to keep the contact time of the base and the swelling agent to a minimum so that the synthetic textile is not destroyed and continuous processes can be utilized.

The following table gives an approximation of the times versus temperatures that are preferred in step (II) of this invention.

| TIME | TEMP./degrees F. |
| --- | --- |
| 1 sec. | 600 |
| 30 sec. | 400 |
| 10 min. | 265 |
| 15 min. | 260 |
| 20 min. | 252 |
| 25 min. | 246 |
| 30 min. | 240 |
| 35 min. | 237 |
| 40 min. | 228 |
| 45 min. | 220 |
| 50 min. | 210 |
| 55 min. | 208 |

It has been found by the inventor herein, that the operating time can be as small as 1 second, in that, as soon as the operating temperature of 600 degrees F., for example, is reached, the heating of the bath and apparatus can be discontinued and the bath and apparatus can be rapidly cooled, with the result that full treatment can be effected. It is preferred to run the bath and the apparatus for a period of at least 1 second, and up to a period of about two hours. It is more preferred that the operating time be from 1 or 2 minutes to less than one hour, and it is most preferred that the process be operated for a period of 1 or 2 minutes to 10 minutes.

The objective of steps (I) and (II) is to treat the textile such that the surface is altered and it is, for example, receptive to printing and the like. Since the textiles contemplated as useful within the scope of this invention vary somewhat in their chemical makeup, it is desirable to test each type of textile to determine which set of conditions gives the optimum treatment. Thereafter, it is just a matter of applying essentially the same conditions to the fabric in order to get the desired level of treatment. For example, it is wholly adequate to treat 100% polyester fabric at 208 degrees F. for 55 to effect the treatment. When steps (I) and (II) are completed, the next step in the process is to acidify the bath to reduce the pH to the acid side of the pH scale. Therefore, step (III) comprises adding an acid to the bath to drop the pH of the bath to the acid side. This can be accomplished by dropping the step (I) and (II) bath to the drain, refilling with rinse water and then adding the acid thereto or it can be accomplished by just adding the acid to the bath at the end of step (II). The acids useful herein are both the mineral acids and the organic carboxylic acids. Preferred are the organic carboxylic acids such as formic, acetic propionic and the like. Especially preferred is acetic acid because of the ease of handling and its compatibility with its use in the textile industry. The acid is simply added to the bath as the process is cooling down. The bath can be cooled slightly, or it can be cooled to room temperature, depending on what the operator needs or wants to do with the textile. For example, if operator wishes to continue the treatment of the textile with additional chemicals, then the temperature is typically not taken much below about 120 degrees F. At any rate, the key to the inventive process, is to reduce the pH of the bath and the textile below a pH of 7. Generally, step (III) is run in the 4.5 to 6.5 pH range for best results.

Finally, the textile is rinsed with clean water and then removed from the apparatus and eventually dried.

A second process of this invention, and the most important aspect of the invention, is a process in which the operation is carried out through step (III) and then, the textile is contacted with an active substance for at least 5 minutes before the bath is cooled to room temperature.

Thus, for this second process, the first three steps of the process described above, are carried out on the textile. Thereafter, generally without emptying the bath contents, the textile is contacted by an active substance, which is added to the bath (step IV). The active substance can be added directly to the bath of step (III), or that bath can be dropped and a rinse bath used to rinse the textile can be added, and then the active substance can be added to this bath.

It is desirable to carry out step (IV) with the active substance at an elevated temperature, it being preferred to add the active substance at temperatures just slightly less than the preferred operating temperature of steps (I) and (II). It is contemplated within the scope of this invention to add the active substance at a temperature of at least room temperature and up to the temperture at which steps (I) and (II) are carried out.

Typically, the bath is cooled slightly upon the addition of the acid in step (III) and before the temperature drops too far, it is desirable to add the active substance, and then cool the bath to room temperature, n occasion, it is desirable to add other adjuvants commonly used in the textile industry to the bath before the bath cools to room temperature.

The time of contact of the active substance with the textile is dependent on the textile and the active substance being used. Preferred for this invention is a contact time of at least five minutes. Most preferred, in this step is the addition of the active substance to the product of step (III) after the bath cools slightly. The active substance is thus allowed to contact the textile for the time that it takes to drop the temperature of the bath, which in most cases takes somewhat longer than the five minutes indicated supra.

Once the bath is dropped, the textile is rinsed and then in step (V) removed from the apparatus. As indicated, sometimes it is necessary or desirable to add other adjuvants to the treating bath or to the rinse bath for example, whiteners, dyes and the like. This part of the process is not considered to be critical to the instant invention and no claim is being made herein for the same.

It should be appreciated by those skilled in the art that the active substances useful in step (IV) of this invention, are many and varied. Generally, it is desirable to attain certain functional properties through the use of the active substances. Such preferred functional properties are for example, softening, antimicrobial efficacy, improved hand, water repellency, coupling agents, printability, increased hydrophilicity, increased hydrophobicity, increased wicking, decreased wicking oil resistance enhanced antistatic properties, and increased water absorbency, to name a few.

Since it is believed by the inventor herein that the treatment from the inventive process herein does not essentially require a reactive surface on the fabric, such as the topical applications processes do, the limitations on the types and kinds of materials that can be used as the active substance are few.

Thus, contemplated within the scope of this invention are, for example, hydrophilic polymers, antimicrobial agents, softeners, including silicones, alkyl and dialkyl quaternary ammonium chlorides, ethoxylated amides, and higher alkyl amines; antistatic agents, such as salts of nonionic surfactants, ethoxylated alkyl amines, complex fatty imido compounds, quaternary fatty acid derivatives, high molecular weight polyethylene glycols, diethanol amines, polypropylated quaternary ammonium chlorides, propoxylated quaternary ammonium phosphate salts, cationic fatty acid derivatives and quaternary amides; fire retardants, such as phosphonates, brominated organic phosphorous compounds, organic phosphorous compounds, and antimony compounds; fluorochemical oil repellent agents; soil release agents such as modified polyesters, fluorochemicals and modified acrylics; and water repellent, polymers and agents, such as melamine based resin dispersions, fluorocarbons, modified triazine compounds, reactive nitrogen compounds and aluminum stearate. Such polymers are for example those disclosed in U.S. Pat. Nos. 4,463,036, 4,569,974, and the cellulosic ethers disclosed in U.S. Pat. No. 4,136,218, and the silylated organic polymers as disclosed in U.S. Pat. No. 4,352,917 and the anionic copolymers set forth in U.S. Pat. No. 4,427,557, all of which are incorporated herein by reference to show the types of polymers useful in this invention as the active substance. Also included within the scope of this invention as the active substance are materials which are antimicrobial in nature, such as bis(tributyl tin)oxide, alkylbenzyldimethylammonium chloride, triclosan, and dichlorophene and the silane antimicrobials such as (CH30)3Si(CH2)3N(CH3)2(C18H37)Cl and (CH30)3Si(CH2)3N(C12H25)2(CH3); and, fluoroalkylsilanes and organics used for oil repellency applications on textiles. commonly known and commercially available in the art.

Thus, the inventor herein has described an invention in which new and novel fabrics can be manufactured. These fabrics have improved functional properties and are significantly improved over the fabrics known in the prior art.

Now so that those skilled in the art can understand and appreciate the invention taught herein, the following examples are presented, it being understood that these examples should not be used to limit the scope of this invention over the limitations found in the claims attached hereto.

For purposes of testing the effectiveness of this invention, the following test was developed.

TESTING PROCEDURE FOR THE EFFECTIVENESS OF APPLICATION OF THE INSTANT PROCESS ON FABRICS

To determine if the process of the instant invention has been effective, a sample is washed with a commercial laundry detergent by hand in warm water (100 to 110 degrees F.) with the powdered detergent for five minutes (the commercial detergent was Tide manufactured by Proctor and Gamble). The amount of powdered detergent used, is 2 grams for a 5×5 inch sample. The sample is dried after it has had a thorough rinse in clean water. The dried sample is laid flat on a table or board. An eyedropper is filled with a standard indicator solution of Brom phenol blue indicator, and one drop of the solution is placed in the center of the sample, adjusting the tip of the dropper as close to the sample surface as is possible, but without touching the sample surface. The drop of the solution immediately begins to migrate into a wide blue circle of at least ½ to 1 inch in diameter. Less than a ½ inch diameter should be considered weak wickability and lack of absorbability. The measurement of the circle should be undertaken 5 minutes after the Bromo phenol blue application.

Whenever the term caustic is used herein, it means that the caustic was used in a 50 weight % solids solution unless otherwise indicated.

Whenever trichlorobenzene is used herein, it means that it is the commercial emulsion consisting primarily of 78 weight percent trichlorobenzene less than 3 weight percent of isopropanol, and less than 2 weight percent of 2-butoxy-ethanol.

In the following examples, all samples were dried before the testing was carried out unless otherwise indicated.

EXAMPLE 1

For purposes of illustration of the instant invention, the following preferred general protocol was followed. Unless indicated otherwise, the equipment used herein was a standard perforated steel beam dye unit. Any significant deviations from this protocol will be indicated in the individual examples. The details will also be set forth in the following examples.

The fabric to be tested is situated in the equipment and the vat is filled with water to the normal operating level. To the water is added the swelling agent and the equipment is run for 1 minute and then the a base is added. The temperature of the bath is raised to the desired operating temperature as quickly as is possible, in this case, about 8 degrees per min to about 265 degrees F., and held there for about 10 minutes. The equipment is then cooled as rapidly as possible to about 220 degrees F. and the bath is drained from the equipment while still hot. The textile is rinsed at about 100 degrees F. for 5 minutes with room temperature service water and drained. At this approximate temperature, water and an acid are added to change the pH to less than about 7. In the preferred embodiment, acetic acid is used, and preferably, the pH is lowered to the 5.0 to 6.0 range. At this point in the process, the bath is allowed to move about the textile for a few minutes and the bath is drained. The textile is then ready for further processing by any preferred means.

The second process of this invention requires the same general protocol as set forth above, except, when the bath is acidified with the acid, instead of draining the bath and rinsing the textile, the bath is subjected to the addition of the desired active agent. The bath is allowed to operate for a minimum of about 5 minutes at a minimum of about 100 degrees F., to treat the textile with the active agent. The bath is drained at this point and the textile is rinsed at 100 degrees F. with water and then rinsed at least once using cold water. The textile is ready at this point for further treatment. Occasionally, it is preferable to add certain finishes to the bath prior to the removal of the textile from the equipment and therefore, this can be undertaken prior to the rinse at 100 degrees F., in each process.

EXAMPLE 2

This example illustrates the process as being applied on white roller towel textiles in a beam dye unit.

The roller towel textiles were composed of 100% warp knit polyester and the total load of roller towel textiles in this run was 529 pounds. The bath consisted of 2000 gallons of service water to which was added 13 pounds of trichlorobenzene as the swelling agent and 50 pounds of a base. The process was run at 265 degrees F. for 10 minutes, cooled to 220 degrees F. and drained hot. The textile was rinsed at 100 degrees for 5 minutes with water, and the bath was dropped, water was added, and the acetic acid was added to give a pH of 5.0. To this was added an active substance which was a material described as Luratex A-25, a polyamide dyeing and finishing agent which is a non-ionic polyamide available from BASF, Chemical Division, Dyestuffs and Pigment Group, Textile Colors and Chemicals Dept. Charlotte, NC. This material was added at the level of 25 pounds, the process was then run for 30 minutes at 220 degrees F. and then the textile was rinsed at 120 degrees F. and then once with cold water. This material after treatment had good water wickability and a very strong one inch diameter ring in the brom phenol blue test.

EXAMPLE 3

This example illustrates the process as being applied on children's sleepwear in a light blue color.

The childrens sleepware fabric was composed of white 100% warp knit polyester and was used in this run at 413 pounds of material. The bath consisted of 700 gallons of service water and the process was carried out in a jet dye apparatus. To the bath was added 13 pounds of trichlorobenzene, and then 30 pounds of a base in increments of 10 pounds, 15 pounds and 5 pounds over a short period of time. The active substance was Luratex A-25 and was added at the level of 10 pounds, along with a blue disperse dye, and then the bath was cooled to 160 degrees F. the bath dropped, rinsed and drained. A very strong 1¼ inch ring developed during the brom phenol blue test.

EXAMPLE 4

This example illustrates the process as being applied on various type 66 nylon fabrics and type 56 polyester fabrics. This run was carried out in a pressure beck apparatus. The goods treated in this example had a weight of 201 pound and the bath consisted of 300 gallons of service water to which 5 pounds of trichlorobenzene and 50 pounds of a base were added. The temperature of the equipment was raised at this time to 265 degrees F. and it was held for 5 minutes. The bath was cooled to 160 degrees, the bath was dropped and then the fabric was rinsed. Dried samples taken at this time showed a strong one inch or better ring in the brom phenol blue test. The test was then continued on the remaining fabrics, and 5 pounds of acetic acid was added to adjust the pH to 6.0 and then seven pounds of Luratex A-25 was added and the bath was held at 245 degrees for about 20 minutes. The bath was cooled to 160 degrees F., the bath was dropped and the lot was rinsed. All of the samples showed at least a one inch ring in the brom phenol blue test.

EXAMPLE 5

In jet dyeing equipment, approximately 530 pounds of toweling was situated in 1200 gallons of service water. To this was added 13 pounds of trichlorobenzene and 55 pounds of liquid caustic (50%) and this bath was held at 265 degrees for about 20 minutes. The bath was cooled to 160 degrees, the bath was dropped and rinse water was added. To the bath was added 20 pounds of acetic acid to adjust the pH to 5.5. To this bath was added 10 pounds of Luratex A-25, and 5.3 pounds of a whitener purchased as Leucophor G from the Sandoz Dye Co., Charlotte, N.C., and this bath was held at 225 F. degrees for 30 minutes, the bath was cooled to 160 degrees, the bath was dropped, rinse water was added and the material was dried after the removal of the rinse water. The sample gave a ring of 1 1/8 inches in the brom phenol blue test.

EXAMPLE 6

This example was carried out in beam dyeing equipment and consisted of 2119 pounds of incontinent pad fabric composed of 100% polyester warp knit. To the bath composed of 2000 gallons of service water, was added 32 pounds of trichlorobenzene and 50 pounds of caustic. This bath was heated and held at 265 F. degrees for about 10 minutes and the bath was cooled to 220 degrees F., then dropped. Water was added back and 15 pounds of acetic acid was added to adjust the pH to 5.5. Then 26 pounds of Luratex A-25 and 21 pounds of whitener, Leucophor G was added to the bath and the bath was heated to 220 degrees F. for 30 minutes, cooled to 200 degrees F., and then dropped. This material showed a 1¼ inch halo when subjected to the brom phenol blue test.

EXAMPLE 7

This example was carried out on Antron ®/Lycra ®, white fabric (tradenames of E.I. duPont, Wilmington, Del.) in an Ahiba batch dyer, manufactured by Ahiba, Inc., Charlotte, N.C., and consisted of 400 cc of service water and 20 grams of unscoured sample. The bath consisted of 7 cc of liquid caustic and ½ cc of trichlorobenzene and the bath was held at 220 degrees F. for 20 minutes, cooled to 100 degrees F. The bath was dropped and water was added back, and then the pH was adjusted with acetic acid to 5.0. The fabric was then hand rinsed in clean water and was placed into a bath consisting of 1 cc Luratex A-25 in 400 ml, of service water and this bath was held at 220 degrees F. for 20 minutes and the bath was dropped, rinsed and the material dried. This material has a good brom phenol blue test indicating that the process enhanced the wettability and wickability of this material. The material showed a good 1½ inch halo.

EXAMPLE 8

This example consisted of using T-6 white nylon and a 20 gram sample was placed in 400 cc of service water to which was added 7 cc of caustic and ½ cc of trichlorobenzene. This bath was held at 220 degrees F. for 20 minutes, cooled to 160 and the bath was dropped and fresh water was added to rinse, and then the bath was acidified using acetic acid to a pH of 5.0. The sample was then hand rinsed under clear water. This sample was then placed in a bath consisting of 1 cc of Luratex A-25 in 400 ml of service water and held for 20 minutes at 220 degrees F., cooled, dropped and then rinsed and dried. This material also had good wettability and wickability as witnessed by the brom phenol blue test wherein it showed a 1 inch halo.

EXAMPLE 9

This example was run in a small pressure beck with the reel at the top.

Ten pounds of 50/50 nylon 66 and cotton blend military underwear fabric and 4 small samples of sheeting composed of blends of polyester/cotton, ranging from 80/20 to 50/50 percent blends, were processed together by using 2 and ¼ pounds of trichlorobenzene and 3 and ¼ pounds of caustic in 90 gallons of service water. The bath was heated to 265 degrees F. for 10 minutes, cooled to 160 degrees and then dropped and then rinse water was added.

The bath was neutralized with 2 pounds of acetic acid to adjust the pH to 6.0 and then 1 and ¾ pounds of Luratex A-25 were added. The bath was heated to 220 degrees F. for 30 minutes, cooled to 160, dropped, and then the material was rinsed and dried. The brom phenol test showed that all of the samples exceeded the 1 inch halo and some of the samples had halos as large as 1½ inches.

EXAMPLE 10

This illustrates the treatment of a nylon/cotton blend. This example was run in the presence of commercial fabric and in a commercial run. The fabric of this run was scheduled to be dyed, and therefore, there was present in the run the dye developer, sodium hydrosulfide. As the process ran, the material was subjected to caustic, trichlorobenzene, appropriate temperatures, and rinses and samples were withdrawn from the run periodically and tested via the brom phenol blue test. The object of the run was to determine the effectiveness of the instant inventive method at the various stages of the process, wherein the materials were continuously run through a bath at room temperature and subjected to a steam treatment in a tower following the treatment. The following table shows the results:

| POINT IN THE TREATMENT THAT SAMPLE WAS PULLED | BROM PHENOL BLUE TEST RESULT | |
|---|---|---|
| | wet | dry |
| no prior treatment but caustic had been added to the bath | | ½ in. |
| caustic and trichlorobenzene had been added 600 F./5 sec. | ⅜ in. | ⅜ in. |
| caustic, trichlorobenzene and acetic acid had been added | | ⅜ in. |
| caustic, trichlorobenzene, acetic acid, Luratex-25 had been added, no steam | | 1 in. |
| caustic, trichlorobenzene, acetic acid, Luratex-25 had been added and super steam used | | >1 in. |

EXAMPLE 11

This example deals with the treatment of a nylon/-LYCRA swimwear fabric and was carried out in a beam dye apparatus using 224 pounds of goods and 1500 gallons of water. To the bath was added 6 pounds of trichlorobenzene and 50 pounds of caustic. This bath was held at 220 degrees F. for 20 min and then quickly dropped to 160 degrees F., and adjusted to a pH of 6.0 using about 5 pounds of acetic acid. Then there was added to the bath 25 pounds of Luratex A-25 and the bath was heated to 220 degrees and held for 20 minutes, cooled, and then rinsed. When tested in the brom phenol blue test, the result was a halo of 1 and ¼ inches.

EXAMPLE 12

This example illustrates the process on 100% polyester wiping cloth.

Thirty pounds of goods and 90 gallons of water to added to a beam dye apparatus along with ¼ pound of trichlorobenzenze and 3 and ½ pounds of caustic. This bath was held at 265 degrees F. for 10 minutes, colled to 220 degrees and the bath was then dropped. Water was added to the equipment, and then there was added 2 pounds of acetic acid to adjust the pH to 5.5. There was then added to the bath 2 pounds of Luratex A-25 and the bath was held at 220 degrees F. for 20 minutes. This material had good wicking capabilities and when tested in the brom phenol blue test, it showed greater than a one inch halo.

EXAMPLE 13

This example was carried out in a jet dyeing apparatus and consisted of 1200 gallons of service water and 150 pounds of roller towel and sheeting material composed of 100% polyester warp knit. The bath had added to it, 5 pounds of trichlorobenzene and 65 pounds of caustic and the bath was heated to 265 degrees F. and held for 15 minutes. It was immediately cooled to 160 degrees, dropped and rinsed and neutralized to a pH of 6.0 by the addition of 20 pounds of acetic acid. Then, there was added to the bath 20 pounds of Luratex A-25 and 1.5 pounds of Leucophor G whitener. The bath was heated to 225 degrees F. and held for a period of about 20 minutes. The bath was cooled to 160 degrees, the bath was dropped and then the material was rinsed. This material had good wicking and had a halo of 1¼ inches in the brom phenol blue test.

EXAMPLE 14

This run consisted of 1470 pounds of incontinent pad material composed of 100% polyester warp knit. To this material in a beam dyeing apparatus was added 23 pounds of trichlorobenzene and 55 pounds of caustic and the process was run at 265 degrees for 10 minutes, cooled to 220 degrees, hot dropped, and then water was added back as a rinse. The bath was adjusted to a pH of 2.2 by using acetic acid at the level of 15 pounds.

Then there was added 26 pounds of Luratex A-25 and the process was run at 220 degrees F. for 30 minutes, cooled, the bath was dropped, the material was rinsed to give a product having a brom phenol test showing a 1¼ inch halo.

EXAMPLE 15

This run consisted of 1480 pounds of incontinent pad material composed of 100% polyester warp knit and was run in a beam dye apparatus using 23 pounds of trichlorobenzene and 55 pounds of caustic at 265 degrees F. for 10 minutes. The bath was cooled, dropped and a rinse was added back in. This bath was neutralized using 15 pounds of Luratex a-25 and the process was run for about 30 minutes at 220 degrees F. The bath was cooled, dropped, and the material was rinsed. The brom phenol blue test showed a halo of 1.5 inches.

EXAMPLE 16

This example consisted of running 2068 pounds of incontinent pad material composed of 100% polyester warp knit in a beam dye apparatus and an aqueous bath consisting of 32 pounds of trichlorobenzene and 50 pounds of caustic at 265 degrees F. for 10 minutes, and then neutralizing with 15 pounds of acetic acid to a pH of 6.0. There was then added to this bath 36 pounds of Luratex A-25 and 20 pounds of Leucophor G whitener and the process was run at 220 degrees F. for 30 minutes. This material showed good wicking and a 1 inch halo in the brom phenol blue test.

EXAMPLE 17

The above process of Example 16 was repeated except that the material treated was Eastman polyester tow composed of 100% polyester. This material had good wicking.

EXAMPLE 18

The above process of Example 16 was repeated except that the material treated was Celanese comfort fiber ® tow, composed of 100% polyester. This material also had good wicking.

EXAMPLE 19

This example was run in a jet dye apparatus and consisted of 219 pounds of material consisting of 69 pounds of white uniform material composed of 100% polyester, and 150 pounds of white fleece jogging suits and white mesh jersey material. The bath consisted of 300 gallons of service water and 5.5 pounds of trichlorobenzene and 50 pounds of caustic and the process was run for about 10 minutes and at a temperature of about 265 degrees F. The bath was cooled, dropped, and then rinsed with clean service water. The bath was then neutralized with acetic acid to a pH of about 6.0. The jogging fleece and the jersey material were then removed from the bath. The bath was then subjected to 12 pounds of Luratex A-25 and the process was run at a temperature of 220 degrees F. for about 30 minutes. The bath was then cooled to 160 degrees, dropped, rinse water returned to the apparatus, and the uniform material was removed. The uniform material showed a brom phenol blue test halo of about 1 inch. The jogging fleece and the jersey material were returned to the apparatus, 12 pounds of Luratex A - 25 was added, along with disperse red dyes, and the apparatus was heated to 220 degrees F. and held there for about 30 minutes. The bath was cooled to 160 degrees, the bath was dropped, and fresh service water was returned. These materials, when tested in the brom phenol blue test showed a halo of 1 inch, and the wickability of these materials was very good. They both had taken a uniform, bright red dye.

EXAMPLE 20

This example is a comparison of the instant invention to the conventional topical application of certain functional finishes to fabrics to show the benefits of the instant invention regarding permanency of wickability and soil release. The chemicals used in the comparative study include Quaker QCF (Alkaril QCF) now manufactured by Alkaril Chemicals Inc., Winder, GA; Milease T. manufactured by ICI Americas, Dyes & Textile Chemicals Division, Wilmington, Delaware, and Scotch Release FX226, manufactured by 3M Company, St. Paul, MN.

This test followed AATCC test method 61-1968 with IIA Test, that is, 120 degrees F. with 150 ml solution for 45 minutes with 50 steel balls. The detergent was AATCC Standard Detergent 124-W.O. A Launder-Ometer, manufactured by Atlas Electrical Devices Co., Chicago, Illinois was used to rotate the containers in a thermostatically controlled water bath at 42 rpm.

All of the topical polymers were applied at 2 weight percent (WOF) of the fiber or fabric tested, using the AATCC test method. The instant invention samples were prepared by the preferred method, using the process as essentially set forth in example 1.

It was noted that there was a distinct change in the samples after five simulated washings. All of the topical treatments showed less soil release than the instant invention sample, the soil release of the sample of the instant invention was decidedly better than any of the topical treatments.

After 15 simulated washings, Milease T showed the poorest soil release and the Quaker QCF and Scotch Release RX226 showed similar, but, slightly better soil release than the Milease T. The instant process material showed decidedly improved soil release.

Soil release and wickability followed similar courses with all of the topicals showing slow wickability after 15 washes and complete loss of wickability at the 20 to 25 washings.

EXAMPLE 21

Fabrics treated by the process of the instant invention were subjected to a Kenmore washing machine test. Polyester fabrics treated essentially by the process as set forth in example 1 were washed in a heavy duty Sears Kenmore washing machine, model number 70 series, at 120 degrees F. with Tide ® soap, purchased in the state of North Carolina. At each 10th washing, the samples were checked for soil release and wickability. At the 200th wash there was still soil release and wickability. Wicking took place in three to five seconds. Soil release showed very little change from the first to the 200th washing. The samples, at the end of the 200th wash, were then subjected to 5 washings with no soap, and the fabrics continued to show good soil release and wickability of 3 to 5 seconds.

The samples were tested after the 200th washing for water absorption using the following tests. The results follow.

A 400 cc glass beaker is filled with distilled water which contains a small amount of a blue dye. A 3 inch by 8 inch piece of the fabric to be tested is suspended vertically over the beaker with the 8 inch dimension in the vertical position. The fabric is lowered so ⅛ inch of the fabric is immersed in the dyed water and a stop watch is started at the same instant. The distance that the dyed water wicks up the fabric is measured in centimeters at 20, 40, 80 and 120 second intervals. This same test is used to determine horizontal wicking, but when the test is termed horizontal, the test has been carried out such that the 8 inch dimension of the fill yarns are in the horizontal direction, rather than in the vertical direction.

| Fabric | original weight /gms. | Final weight /gms. | water pickup % |
|---|---|---|---|
| treated polyester | .57 | 2.31 | 405.3 |
| untreated polyester | .58 | 1.55 | 267.2 |
| untreated nylon | .68 | 1.49 | 219.1 |
| untreated cotton | .65 | 2.70 | 415.4 |

Thus, it can be observed that the process rendered the hydrophillic polyester as water absorbable as cotton material.

Wicking tests were conducted on the materials with the following results:

| FABRIC | TIME | | | |
|---|---|---|---|---|
| | 20 SEC. | 40 SEC. | 80 SEC. | 120 SEC. |
| HORIZONTAL WICKING (fabric filling direction) Liquid Spread in centimeters | | | | |
| TREATED POLYESTER | 6.0 | 7.8 | 10.3 | 12.2 |
| UNTREATED POLYESTER | 0.0 | 0.2 | 0.5 | 0.6 |
| UNTREATED NYLON | 0.2 | 0.5 | 1.0 | 1.2 |
| UNTREATED COTTON | 1.6 | 1.9 | 2.9 | 3.5 |
| VERTICAL WICKING (warp direction) Liquid Spread in centimeters | | | | |
| TREATED POLYESTER | 7.0 | 10.3 | 14.5 | 17.2 |
| UNTREATED POLYESTER | 0.2 | 1.0 | 1.2 | 1.4 |
| UNTREATED NYLON | 0.5 | 1.0 | 1.8 | 2.3 |
| UNTREATED COTTON | 2.0 | 2.5 | 3.3 | 4.0 |

The above results show the horizontal and vertical wicking was improved by the process of this invention and that a rapid transfer of moisture through a material treated with the instant process is excellent, even when compared to cotton fabric.

The wettability characteristics of the material of this inventive process were tested and gave the following results.

| | WETTABILITY Liquid Spread in square centimeters | | | | |
|---|---|---|---|---|---|
| | TIME | | | | |
| FABRIC | 5 SEC. | 10 SEC. | 20 SEC. | 40 SEC. | 80 SEC. |
| TREATED POLYESTER | 2.0 | 5.0 | 7.5 | 10.0 | 13.0 |
| UNTREATED POLYESTER | 0.3 | 0.3 | 0.3 | 0.3 | 0.3 |
| UNTREATED NYLON | 0.4 | 0.4 | 0.4 | 0.4 | 0.4 |
| UNTREATED COTTON | 0.7 | 1.0 | 1.8 | 2.0 | 3.8 |

The rate of drying of the fabrics tested above was as follows:

| FABRIC | MINUTES TO DRY |
|---|---|
| TREATED POLYESTER | 9.5 |
| UNTREATED POLYESTER | 7.0 |
| UNTREATED NYLON | 7.0 |
| UNTREATED COTTON | 25.0 |

EXAMPLE 22

The material used in this example was army underwear material which had already been treated with the camoflage design, but was not yet developed. This run was carried out on large commercial equipment designed to develop the dye. The developing of the vat dyes in the camoflage design are usually done in a caustic solution, and so this commercial equipment lends itself very well to the instant invention. The vat bath was adjusted to a pH of 13, which was at room temperature. Large reels of the material are set in place and the apparatus is constructed such that the material is removed from the reel on a continuous basis and carried through the various processing steps on a continuous basis, and the material comes off of the apparatus at the end and is placed on a large reel. Trichlorobenzene is placed in the caustic bath in the path of the material and as the material leaves this bath, it is passed through squeeze rolls and on to a steam chamber which is operating at about 400 degrees F. The residence time of the treated material at this temperature is about 3 seconds. The material is then passed through the remainder of the steps normally required to treat the material and develop the dye, such as oxidizing, rinsing, and the like, and then the material is moved unto the reel. Samples of the material are later removed from the reel and subjected to an acetic acid rinse by hand to neutralize the caustic. In a laboratory size Ahiba, the samples are then subjected to Luratex A - 25 in a bath for 30 minutes at 220 degrees F. The bath is then cooled, dropped, and the material is rinsed and dried. The material shows good wicking and greater than 1 inch halo when subjected to the brom phenol blue test.

EXAMPLE 23

Ten grams of a Mylar film sample were subjected to the inventive process using 1/4 cc of trichlorobenzene in 200 cc of service water and 3.5 cc of caustic, giving a pH of 12.5. This bath was heated to 265 degrees and held for 10 minutes. It was then cooled to 140 degrees and ½ cc of acetic acid was added and the bath was removed and new rinse water was added. To this was added ½ cc of Luratex A - 25 and 200 cc of water. This bath was heated to 220 degrees and held for 30 minutes and then cooled to 160 degrees, dropped, and rinsed. There was a very noticable pickup of water when a drop or two was placed on the surface of the treated film.

EXAMPLE 24

An aqueous bath was adjusted to a pH of 12.3 using ammonium hydroxide as the base. This run was similar to Example 7 and was run in an Ahiba. Samples of 100% polyester were run and tested in side by side comparsions with samples run using caustic. The samples using ammonium hydroxide as the base in the first step of the process in conjunction with the swelling agent, showed a halo of about 1 inch when tested in the brom phenol blue test, while the samples using caustic in the first step of the process in conjunction with the swelling agent, showed about 1½ inches in the same test.

EXAMPLE 25

Fabrics treated by the process of this invention are more susceptible to printing than those materials that are not so treated. When samples were subjected to sublistatic printing using a dark navy blue color, which is considered to be a critical color, the following was noted.

| FABRIC TESTED | TEST POINT | RESULT |
|---|---|---|
| untreated polyester | | poor printing |
| treated polyester | at the end of Step III | slightly better than the untreated |
| treated polyester | at the end of Step V | significantly better than the Step III treated polyester and very significantly better |

| FABRIC TESTED | TEST POINT | RESULT |
|---|---|---|
| | | than the untreated polyester |

EXAMPLE 26

An attempt was made to compare the process of the Bauer patent, U.S. Pat. No. 4,370,143, with the instant process. The experiment herein was carried out by following example 4 of the Bauer patent as closely as was possible.

In this example, Hipochem TXF - 5, a dye leveling agent was used instead of Permalev PES. The Hipochem is available from High Point Chemical, High Point, N.C. The test was carried out in an Ahiba apparatus under the following conditions. The material treated was a 100% polyester, and after the treatment, the treated fabrics were hand washed with Tide at 120 degrees F. and given a brom phenol blue test between each washing, wherein the test was read at three minutes after putting the drop on the fabric. The extent of the treatment as well as the durability of the treatment was being tested. Sample A was run according to example 4 of the Bauer patent under the following conditions. The fabric was placed in the equipment. The equipment was filled with water and the quaternary compound BTC 824 (Lyndall Chemical Co., Dalton, Ga.) was added at the level of 1 gm/liter while the temperature was at 80 degrees F. Five grams/liter of caustic was added and the bath was cirulated at 80 degrees F. for about 10 minutes, and then it was heated to 200 degrees F. at 3 degrees F./minute and then held at 200 degrees for 30 minutes. The bath was cooled to 90 degrees F. and the pH was adjusted to 5.0 with 0.25% wof of acetic acid. The nonionic dye leveling agent was added at a level of 4% wof and mixed for 5 minutes, whereupon the dye carrier, trichlorobenzene, was added to the bath and stirred for about 5 more minutes. The sequestering agent, Fancolene ND (W. F. Fancourt, Greensboro, N.C.) was added at 0.25% wof and the whole stirred for 5 more minutes, and finally, some additional acetic acid was added to the bath (0.25% owf) along with Milese T at 7% wof. The bath was heated to 140 degrees F. and held for 15 minutes and then heated to 230 degrees F. at 3 degrees/minute and held there for about 1 hour. The bath was cooled to 180 degrees and then rinsed, and cooled to room temperature. The entire process took about 5 and ½ hours to finish.

Sample B was a sample of the same polyester fabric which had been treated by the process of the instant invention in the following manner:

The fabric was placed in the equipment and the equipment was filled with water and trichlorobenzene at 2.5 gms/liter was added along with 5 gms/liter of the caustic. The whole was heated to 265 degrees F. at 8 degrees/minute and the whole was held there for 10 minute. The bath was then cooled and dropped and water was added back to the equipment and 0.25% wof of acetic acid was added to reduce the pH to 5.0. Then, Luratex-25 was added and the bath was heated to 220 degrees F. at 6 degrees/minute and held for 30 minutes whereupon the bath was cooled and rinsed and the fabric was removed. The entire process took about 3 hours to finish.

Sample C was a sample of the same polyester fabric which had been subjected to the Bauer process, using the same procedure as was used in sample A, except that trichlorobenzene was added in the first step along with the caustic. The object was to show that the remainder of the Bauer additives do not significantly detract from the objective of the instant invention.

Sample D is merely the calculation of the percent increase of the effectiveness of the inventive process over the Bauer patent sample, (increase of the treatment in sample B over sample A). The results follow.

| BROM PHENOL BLUE TEST | | | | | | | |
|---|---|---|---|---|---|---|---|
| Halo diameter in inches | | | | | | | |
| Number washings at 120 degrees F. | | | | | | | |
| sample | 0 | 1 | 2 | 3 | 4 | 5 | Avg. |
| A | 0.50 | 0.88 | 0.75 | 1.00 | 1.13 | 1.00 | 0.95 |
| B | 1.25 | 1.38 | 1.25 | 1.38 | 1.38 | 1.25 | 1.33 |
| C | 1.13 | 1.13 | 1.38 | 1.13 | 1.13 | 1.13 | 1.18 |
| D | 250 | 57 | 66 | 38 | 22 | 25 | |

The sample A showed a curious result in terms of the spread of the brom phenol blue dye in that, the brom phenol blue dye stayed as a small spot on the fabric while the water continued to wick out. It is believed that this is the effect of the cationic BTC 824 used in the Bauer process. This effect disappeared after the first washing. There was less wicking on the sample A materials and also, there was slower movement of the moisture through the treated fabric.

EXAMPLE 27

Use of naphthalenes as the swelling agent

When Carrier M-200, purchased from the Lindley company, was substituted for the trichlorobenzene of example 4, the fabric showed a brom phenol blue halo of 1¼ inches. Carrier M-200 is sold as methylnaphthalene in an ester blend.

EXAMPLE 28

When Carrier CD-1, a biphenyl/methyl naphthalene blend was substituted for the trichlorobenzene of example 4, the brom phenol blue test showed a halo of 1¼ inches. Carrier CD-1 was also purchased from the Lindley Chemical Inc., Burlington, N.C.

Thus, the examples 27 and 28 show that several types of swelling agents can be used in this invention without detracting from the process.

What is claimed is:

1. A method of altering the surface of a solid synthetic polymer, the method comprising
   (I) contacting the polymer with a bath of a swelling agent, or a mixture of swelling agents, and a base, at a pH of seven or greater;
   (II) heating the bath to a temperature of at least 200 degrees F. for a time of at least 1 second:
   (III) acidifying the bath to a pH of less than 7;
   (IV) separating the polymer and the bath, whereby a polymer having an altered surface is obtained.

2. A method as claimed in claim 1 wherein in step (II), the bath and the polymer are heated to a temperature of about 265 degrees F. and for a time of about 10 minutes.

3. A method as claimed in claim 1 wherein in step (III), the acid used is acetic acid.

4. A method of altering the surface of a solid synthetic polymer, the method comprising (I) contacting the polymer with a bath of a swelling agent, or a mixture of swelling agents, and a base, at a pH of seven or greater;
(II) heating the bath and polymer to a temperature of at least 200 degrees F. for a time of at least 1 second;
(III) acidifying the bath to a pH of less than 7;
(IV) contacting the polymer with an active substance for at least five minutes;
(V) thereafter separating the polymer and the bath whereupon a polymer with an altered surface is obtained.

5. A method as claimed in claim 4 wherein the solid synthetic polymer is polyester.

6. A method as claimed in claim 4 wherein the solid synthetic polymer is nylon.

7. A method as claimed in claim 5 wherein the polyester is in the form of a textile.

8. A method as claimed in claim 6 wherein the nylon is in the form of a textile.

9. A method as claimed in claim 7 wherein the textile is in the form of a woven blend of polyester and at least one other synthetic polymer.

10. A method as claimed in claim 4 wherein the swelling agent is trichlorobenzene the base is caustic, the temperature of the bath in step II is at least 265 degrees F. the temperature of the bath in step II is held for at least 5 minutes, the acid used in step III is acetic acid, and, the active substance used in step IV is a nonionic polyamide polymer.

11. A method as claimed in claim 10 wherein the active substance is a nonionic oxyethylated polyamide polymer.

12. A method as claimed in claim 4 wherein the active substance is a silylated organic polymer.

13. A method as claimed in claim 4 wherein the active substance is an anionic copolymer of ethylene glycol polyethylene glycol, aromatic dicarboxylic acid and alkali metal salt of a sulphonated aromatic dicarboxylic acid.

14. A method as claimed in claim 4 wherein the active substance is $(CH_3O)_3Si(CH_2)_3N^+(CH_3)_2(CH_{18}H_{37})Cl^-$.

15. A method as claimed in claim 1 wherein the solid synthetic polymer is in the form of a film.

16. A method as claimed in claim 4 wherein the solid synthetic polymer is in the form of a film.

17. The synthetic polymer when prepared by the method of claim 1.

18. The synthetic polymer when prepared by the method of claim 4.

19. In a continuous method of altering the surface of a solid synthetic polymer, the method comprising
(I) continuously feeding the solid polymer into a bath of a swelling agent, or a mixture of swelling agents, and a base, at a pH of seven or greater;
(II) continuously removing the solid polymer from the bath and removing the excess swelling agent and base from the polymer;
(III) continuously passing the solid polymer through a heating treatment wherein the temperature of the heating treatment is 200° F. or greater;
(IV) passing the solid polymer through an acidified bath;
(V) rinsing the removed solid polymer to remove or reduce the acidity thereof, whereby a polymer having an altered surface is obtained.

20. In a continuopus method of altering the surface of a solid synthetic polymer, the method comprising
(I) continuously feeding the solid polymer into a bath of a swelling agent, or a mixture of swelling agents, and a base, at a pH of seven or greater;
(II) continuously removing the solid polymer from the bath and removing the excess swelling agent and base from the polymer;
(III) continuously passing the solid polymer through a heating treatment wherein the temperature of the heating treatment is 200° F. or greater;
(IV) passing the solid polymer through an acidified bath;
(V) contacting the solid polymer with an active substance for at least 5 minutes;
(VI) rinsing the solid polymer, whereby a polymer having an altered surface is obtained.

21. The solid synthetic polymer when prepared by the method of claim 19.

22. The solid synthetic polymer when prepared by the method of claim 20.

23. An article when manufactured from the solid synthetic polymer of claim 17.

24. An article when manufactured from the solid synthetic polymer of claim 18.

25. An article when manufactured from the solid synthetic polymer of claim 21.

26. An article when manufactured from the solid synthetic polymer of claim 22.

* * * * *